(12) United States Patent
Müller et al.

(10) Patent No.: US 6,886,165 B1
(45) Date of Patent: Apr. 26, 2005

(54) METHOD FOR THE DIRECT CALL OF A FUNCTION BY A SOFTWARE MODULE BY MEANS OF A PROCESSOR WITH A MEMORY-MANAGEMENT UNIT (MMU)

(75) Inventors: Stefan Klemens Müller, Stolberg (DE); Rudolf Nacken, Linnich (DE); Clemens Bierwisch, Aachen (DE); Ulrich Dieterle, Stolberg (DE)

(73) Assignee: National Instruments Corporation, Austin, TX (US)

( * ) Notice: Subject to any disclaimer, the term of this patent is extended or adjusted under 35 U.S.C. 154(b) by 615 days.

(21) Appl. No.: 09/702,357

(22) Filed: Oct. 30, 2000

(30) Foreign Application Priority Data

Nov. 12, 1999 (DE) .......................................... 199 54 407

(51) Int. Cl.⁷ ............................................. G06F 15/163
(52) U.S. Cl. ....................................... 719/310; 718/108
(58) Field of Search ........................... 719/310; 711/154

(56) References Cited

U.S. PATENT DOCUMENTS

| | | | | |
|---|---|---|---|---|
| 5,293,597 A | * | 3/1994 | Jensen et al. ................ | 711/207 |
| 5,369,749 A | * | 11/1994 | Baker et al. ................. | 718/104 |
| 5,390,332 A | * | 2/1995 | Golson ........................ | 710/269 |
| 5,428,779 A | * | 6/1995 | Allegrucci et al. ......... | 709/108 |
| 5,619,704 A | | 4/1997 | Yagi et al. | |
| 5,987,582 A | * | 11/1999 | Devic ......................... | 711/206 |
| 6,029,206 A | * | 2/2000 | Endicott et al. ............ | 709/315 |

OTHER PUBLICATIONS

Skivkumar Kalyanaraman, Process Management concepts, 1998.*
NEC, Sever–Dispersing database implementation procedure via flag control–involves performing data processing of content of access establishment demand using server side flag control function after access establishment demand is accepted, Jul. 1999.*
Bershad, Brian N. et al., "Lightweight Remote Procedure Call", Opening Systems Review (SIGOPS), vol. 23, No. 5, 1989, pp. 102–113.

(Continued)

*Primary Examiner*—Meng-Al T. An
*Assistant Examiner*—LeChi Truong
(74) *Attorney, Agent, or Firm*—Meyertons Hood Kivlin Kowert & Goetzel, P.C.; Jeffrey C. Hood

(57) ABSTRACT

A method for the direct call of a target function by a start function by means of a processor with a memory management unit (MMU) in a computer operated by an operating system. In today's multitasking operating systems, the call of a function of a first task by a second task is executed and managed by the task scheduler of the operating system. The time of the execution of the called function is uncertain and is dependent on the operating system as well as the tasks managed at every point in time by the operating system. One object of the invention is to disclose a method which enables a time-determined call of a function and which is executed immediately in connection with the call. This object is achieved in that the start function is a component of a first task with a first memory context and in that the first task performs a context switch from the first memory context into the other memory context and this memory switch is reversed after the execution of the target function.

10 Claims, 8 Drawing Sheets

OTHER PUBLICATIONS

Stoyenko, A. D., "SUPRA–RPC: SUbprogram PaRAmeters in Remote Procedure Calls," Software–Practice and Experience, vol. 24, No. 1, Jan. 1994, pp. 27–49.

International Search Report, Application No. 00123901.1, mailed May 26, 2004.

Bershad, Brian N. et al., "Lightweight Remote Procedure Call", ACM Transactions on Computer Systems, vol. 8, No. 1, Feb. 1990, pp. 37–55.

"Open VMS Performance Management", Abschnitt 7, 4, 6, S.1, Compaq Computer Corporation, Houston, TX, Jan. 1999, http://kuhub.cc.ku.edu/www/html/721final/6491/6491pro 008.html, researched Apr. 24, 2003.

Massalin, Henry and PU, Calton, "A Look–Free Multiprocessor OS Kernel", Columbia University, NY, Technical Report, NoCUCS–005–91, revised Jun. 19, 1991, pp. 1–19.

Semaphore, Feb. 1, 1995, http://gd.tuwien.ac.at/study/foldoc.cgl?query=Semaphore, researched Apr. 24, 2003, 1 pg.

* cited by examiner

METHOD FOR THE DIRECT CALL OF A FUNCTION BY A SOFTWARE MODULE BY MEANS OF A PROCESSOR WITH A MEMORY-MANAGEMENT UNIT (MMU)

FIELD OF THE INVENTION

The invention pertains to a method for the direct call of a target function by a start function by means of a processor with a memory-management unit (NW in a computer operated by an operating system.

DESCRIPTION OF THE RELATED ART

In multitasking operating systems, several programs are executed (quasi-) simultaneously. Since programs do not always run error-free, multitasking operating systems must minimize the damage in case there is a program error. Thus, multitasking operating systems isolate the memory of individual programs from each other so that the error behavior of one program does not adversely affect other programs. For simplification, the term operating system will be used in the following to refer to a multitasking operating system.

Memory isolation comprises the separation of virtual and physical memory. Memory accesses of programs occur in virtual memory and not in physical memory. Virtual memory is mapped to physical memory by the processor by reading tables. For this purpose, the processor comprises a memory-management unit (MMU). One responsibility of the operating system is to set up and manage these tables. These tables are designated as memory contexts. The memory contexts themselves are in computer memory and are read by the MMU. In contrast to programs, memory accesses of the MMU occur in physical memory and not in virtual memory. To access a memory context, the MMU needs its physical address. For this purpose the processor comprises a MMU control register. The physical address of the current, valid memory context is stored in the MMU control register.

Each program is associated with a particular memory context. A program with its own memory context is designated as a task. Memory contexts are formed by the operating system such that they do not overlap in the physical memory. The memory isolation of the tasks is guaranteed in this way. Thus, the program error of a program occurs only in one memory context and cannot affect other programs in other memory contexts.

The principle of physical isolation of the memory contexts of two tasks is shown in FIG. 1 of the attached drawings.

Data exchange between tasks is made impossible by memory isolation. However, data exchange is necessary in order to make the output data of a task available to another task (e.g., for the data exchange between a database program and a word processing program). Thus, operating systems offer means for inter-task communication. Inter-task communication, however, must be done in such a way that the hole closed by memory isolation is not reopened. Therefore, inter-task communication of operating systems is generally realized by copying the data. The operating system "transports," so to speak, a copy of data from one task to another. By this mechanism, tasks can exchange data without having mutual access to their data.

Data exchange through an operating system has the disadvantage that the highest possible data throughput is not achievable due to the copying of the data. There are applications, however, that require the highest possible data throughput. For such applications, operating systems offer the use of shared memory for direct, mutual data access by different tasks. In shared memory, the memory contexts of associated tasks are formed such that they share a certain physical memory region.

FIG. 2 of the attached drawings shows the principle of shared memory access of two tasks.

Shared memory contradicts the principle of memory isolation. This contradiction is not problematic, however, because it is not possible to arbitrarily force tasks to use shared memory. If tasks are to achieve the highest possible data throughput between each other, then they must include program functions that explicitly request shared memory. Therefore, a task must be configured intentionally by the programmer to use shared memory with certain other tasks. The programmer must take special consideration of the danger of program errors to other tasks in order to avoid further affects of these types of program errors.

In addition to data exchange, there is also the exchange of events, i.e., the exchange of data state changes, which, generally, are only provided through inter-task communication of the operating system. In order not to open the holes that were closed by memory isolation, events are registered by the operating system and transferred at a given time. The operating system "transports" events from one task to another through mechanisms similar for data.

The exchange of events over an operating system has the disadvantage that the time of the transfer depends on the operating system and the other tasks executed by the operating system. Thus, it is not possible to perform an exchange of events with optimum determinability, i.e., with certainty of the time point of the transfer. There are a number of applications, however, where it is necessary to have the highest possible determinability. Analogous to shared memory, it can be understood that the operating systems should now offer a corresponding bypass mechanism. However, no current operating system offers such a mechanism.

Therefore, one object of the present invention is to create a method for the direct and immediate exchange of events between different tasks.

SUMMARY OF THE INVENTION

This object is achieved in that the start function is a component of a first task with a first memory context and the target function is in another memory context and in that the first task performs a context switch from the first memory context to the other memory context, and the context switch is reversed after the execution of the target function.

In other words, the first task includes a function that executes and controls a call of the target function independently of the operating system. Thus, the target function is called directly and with highest determination by bypassing the scheduler of the operating system. The first task thus assumes one of the typical jobs (in the sense of function) of the operating system.

The preferred processing steps for optimum and safe execution of this method are disclosed in the subordinate claims and the following description of embodiments of the invention. In addition, the invention pertains to a software program to execute a method according to the invention as well as a machine-readable data carrier that stores such a software program.

Figure 1:
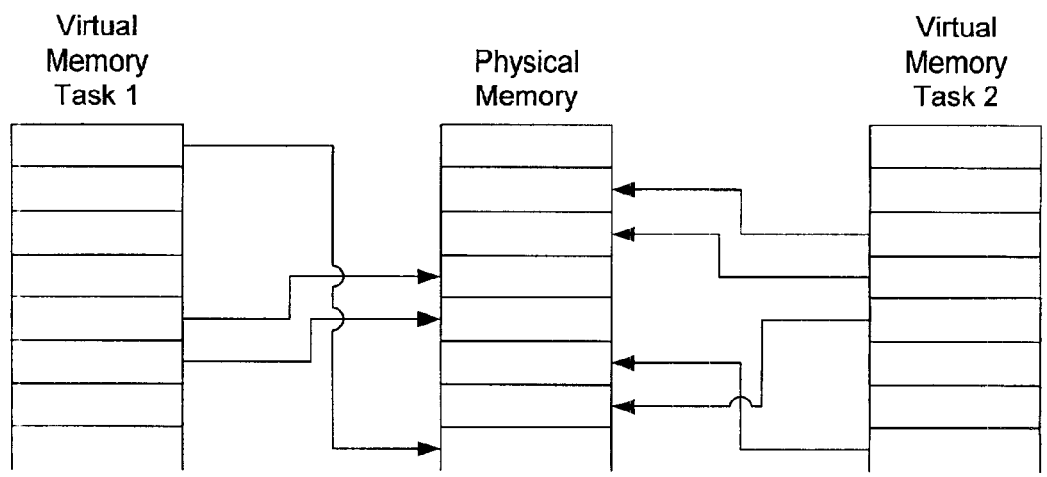
FIG. 1 illustrates the principal of physical isolation of memory contexts of two tasks.
Figure 2:
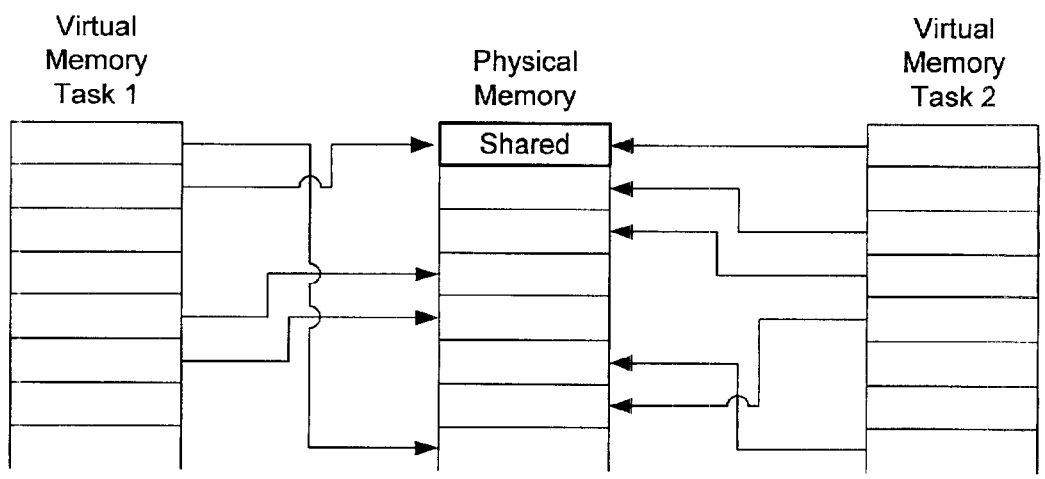
FIG. 2 illustrates the principle of shared memory access of two tasks.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Figure 3:
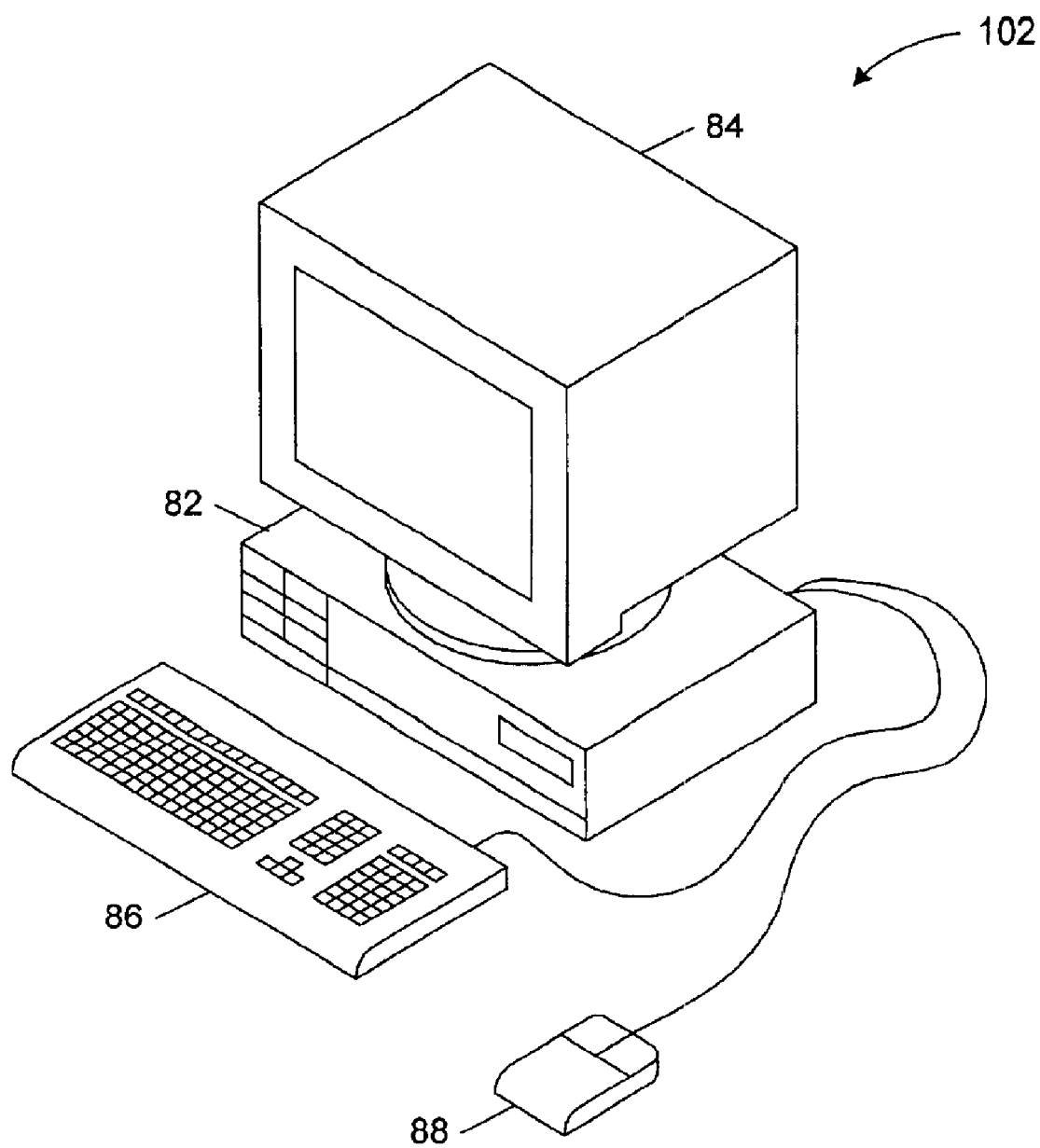
FIG. 3 illustrates an exemplary computer system which includes one embodiment of the present invention.

FIG. 3—Exemplary Computer System

Figure 5:
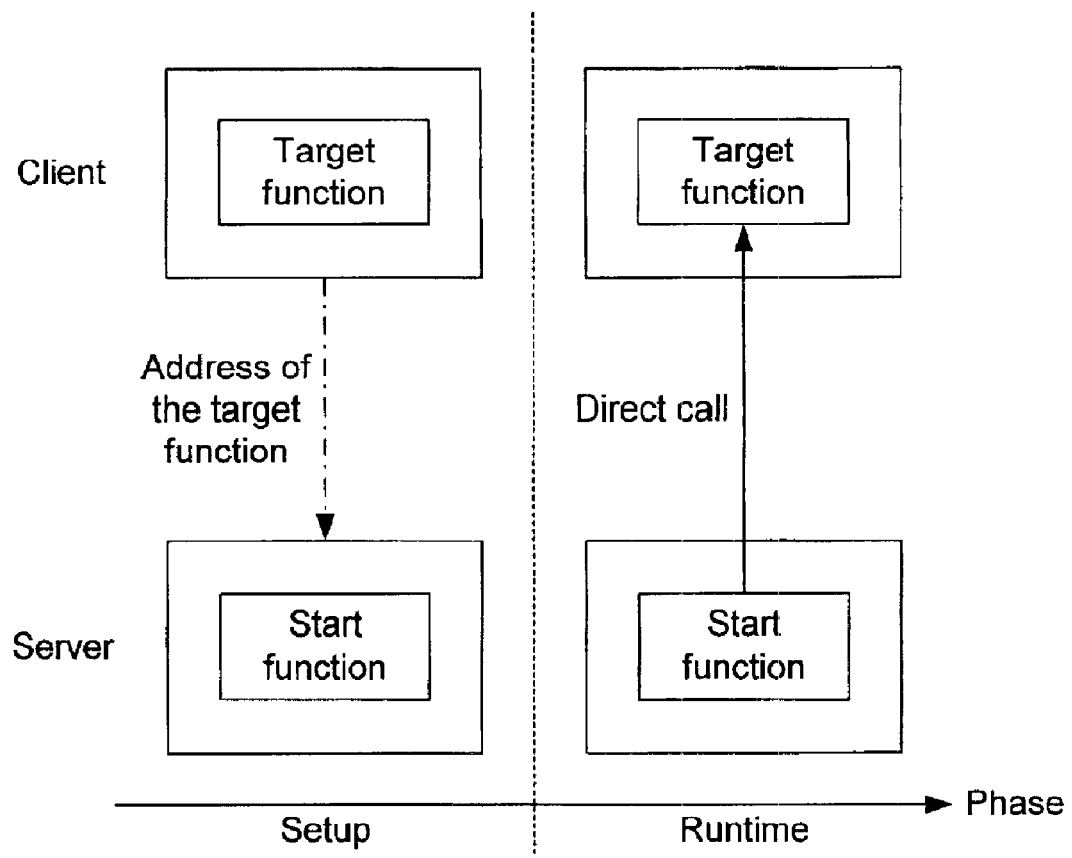
FIG. 5 illustrates the interaction between client and server according to one embodiment of the present invention.

FIG. 3 illustrates an exemplary computer system 102 which may include one embodiment of the invention. One embodiment of the present invention operates in a computer system 102. The computer system 102 may include a system unit 82, display or monitor 84, and one or more I/O devices, such as keyboard 86 and mouse 88. The computer system may take any of various forms, such as a personal computer, mainframe, Internet appliance, personal digital assistant, television and other computing devices. In general, the term "computer system" may encompass any device having a processor which executes instructions from a memory medium. The computer system may store the client program and the server program as shown in FIG. 5.

Figure 4:
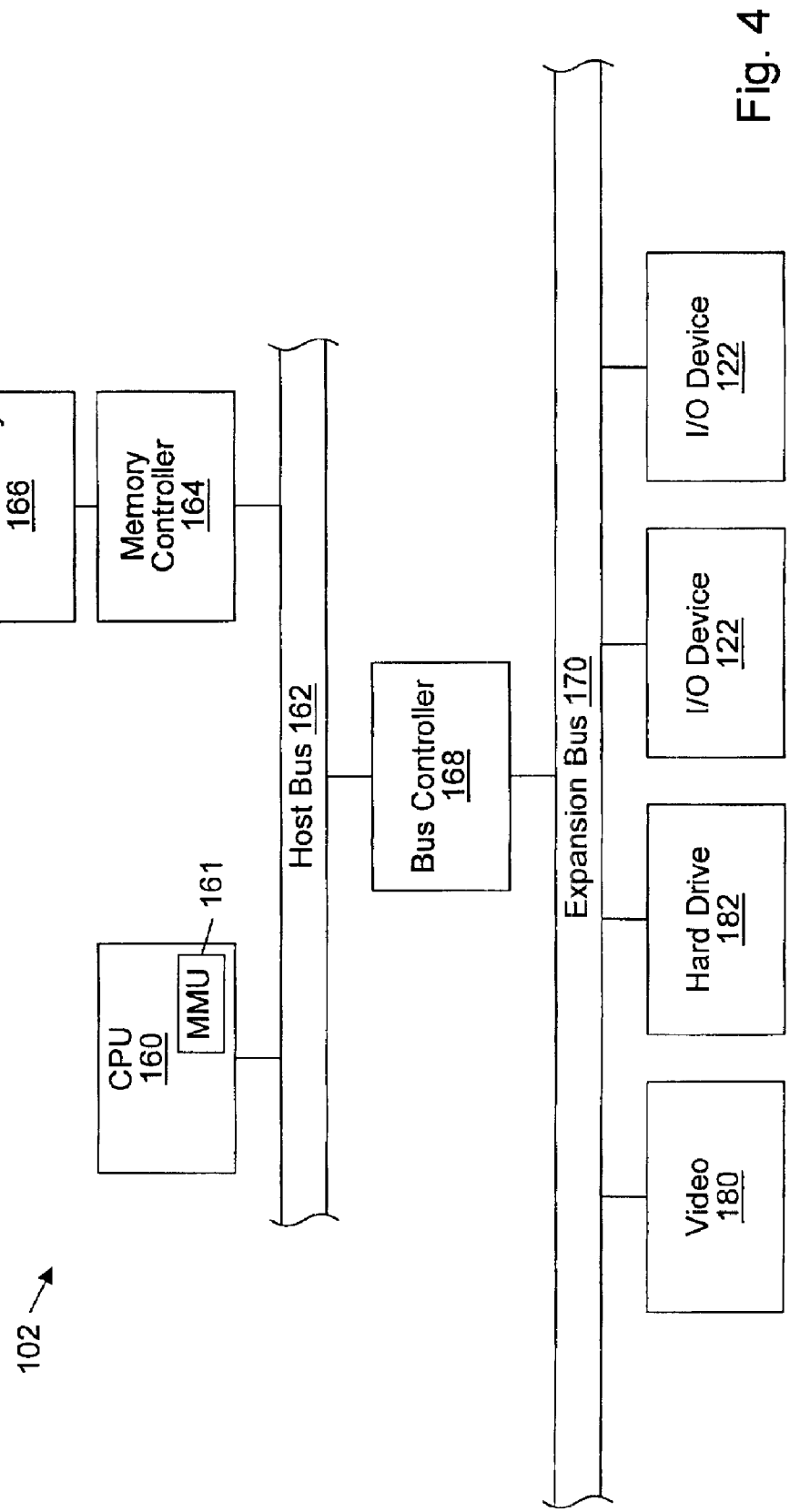
FIG. 4 illustrates an exemplary computer system architecture of the computer system of FIG. 3.

FIG. 4—Exemplary Computer System Architecture

FIG. 4 is an exemplary block diagram of the computer 102 (of FIG. 3). The elements of a computer not necessary to understand the operation of the present invention have been omitted for simplicity. The computer system 102 may include at least one central processing unit or CPU 160 which is coupled to a processor or host bus 162. The CPU 160 may be any of various types, including an x86 processor, a PowerPC processor, a CPU from the Motorola family of processors, a CPU from the SPARC family of RISC processors, as well as others. The CPU may include a memory management unit (MMU) 161. Main memory 166 is coupled to the host bus 162 by means of memory controller 164. The main memory 166 may store the client program and the server program shown in FIG. 5, and may include software according to one embodiment of the invention. The main memory 166 may also store operating system software as well as other software for operation of the computer system, as well known to those skilled in the art.

The host bus 162 may be coupled to an expansion or input/output bus 170 by means of a bus controller 168 or bus bridge logic. The expansion bus 170 is preferably the PCI (Peripheral Component Interconnect) expansion bus, although other bus types can be used. The expansion bus 170 may include slots for various I/O devices 122, as shown. The computer 102 may further comprise a video display subsystem 180 and hard drive 182 coupled to the expansion bus 170.

According to software technology, the most direct (and most deterministic), form of event-forwarding occurs by means of a function call. Here, in one task, a function of another task is called, which corresponds to a call of a function in another memory context. In contrast to inter-task communication, such a call happens "directly" and thus, it is referred to as a direct call.

The direct call is a service that is offered by a task. The task that offers the service of directly calling a function of another task is referred to as the server. The program part of the server that performs the direct call is referred to as the start function. The second task that has a function that should be called directly is referred to as the client because it enlists the service of the server. The directly called function within the client is referred to as the target function.

Similarly to the use of shared memory, the function call in the client according to one embodiment of the invention may be provided by the programmer of the client. The direct call of a function of a task cannot be forced by other programs. Client and server preferably deliberately coordinate with each other in order to achieve the highest possible determinability by means of a direct call.

In order to ensure the general validity of the method, the target function preferably remains callable from the client itself. Further, no compiler-specific settings or functions should be used since such special items are not available on all available computer platforms.

In order to set up a direct call, the client preferably transmits the memory address (in short: address) of its target function to the server. For this purpose, the client uses the inter-task communication of the operating systems. At runtime, the server has the job to execute the direct call. The interaction between client and server is shown in FIG. 5 of the drawings.

The address of the target function which is valid in the memory context (in short: context) of the client, however, is not valid in the context of the server because it is a virtual address. So that the server can use this address meaningfully, the server must know the physical address of the target function. The physical address of the target function is stored in the context of the client. Thus, to determine the physical address of the target function, reading access to the context of the client must be allowed.

Because the server absolutely requires reading access to the context of the client for reasons to be explained below, the address of the client context is transmitted to the server. Because the server cannot access the virtual address of the client context, the client must transmit the physical address of its context.

The physical address of the context is stored in the MMU control register of the processor. The client determines the physical address of its context by reading the MMU control register.

However, the server cannot have reading access to physical memory, but rather only to virtual memory of its own context. The operating system offers mechanisms, however, for associating physical memory with a context. This process is referred to as mapping. Through mapping of the physical address of the client context into the server context, the server would be able to read the client context. In this way, the server could determine the physical address from the virtual address of the target function that is valid in the client context.

Through mapping of the physical address of the target function into the server context, the start function would be able to perform a direct call.

In general, however, functions access absolute-addressed data. In addition, functions can also call additional functions. Furthermore, absolute-addressed jumps can be performed within the functions themselves. The knowledge of the physical address of the target function is, therefore, only sufficient if the target function does not access absolute-addressed data, does not call additional functions, and does not contain absolute-addressed jumps. In practice, this case is rare, however, because a function with such restrictions can produce almost no meaningful results.

In order to remove these restrictions, the physical address of all absolute, virtual addresses in the target function could be determined and mapped into the server context. Then, all the addresses valid in the client context would have to be replaced in the target function with the corresponding mapped addresses in the server context. This method would be very complicated, however, because the program code must be disassembled for this purpose. In addition, a change of the addresses in the target function would mean that the target function (and all functions called from the target function) would not be executable anymore in the client context itself. Thus, the invention must go beyond this method variant (Method Variant 1).

Instead, claim 1 describes a method in which the start function changes from its context to the context of the target function.

The server knows the physical address of the client context. Instead of mapping the target function into its own context, the start function can write the physical address of the client context into the MMU control register. Thus, the start function performs a context switch to the client. It can perform a direct call because all the data and additional functions called from the target function are in the context of the client where the call occurs. After execution of the direct call, the start function writes the original value back into the MMU control register in order to switch back to the server context.

In order for this variant (Method Variant 2) of the direct call to work, the start function must be in the shared memory of the client and server. Otherwise, in the event of switching from the server context to the client context, the validity of the start function would be lost and a return from the target function call to the start function would no longer be possible. Operating systems, however, offer no possibility of placing program code in shared memory. Only data can be in shared memory. This lacking ability of the operating system to place program code in shared memory can generally be reproduced by writing accesses to the corresponding context. In a concrete case, the part of the server context containing the start function would be copied into the client context. Through this copying process, the start function is in the context of the client so that it is possible to return from the target function call to the start function.

There is a problem, however, because a context switch belongs to the fundamental jobs (in the sense of function) of the operating system. Thus, operating systems cannot process an autonomous context switch by a task. In scheduling, operating systems store the physical context address of the task instead of reading them from the MMU control register each time. If a task executes a context switch autonomously and then it is interrupted by the scheduler of an operating system, the operating system will assign the task its original context, and not the context the task had switched to, at the next assignment of processor time to the task. Thus, the target function would be executed in the wrong context. The server should absolutely avoid scheduling by the operating system at the runtime of the start function and the called target function. This condition on the server is referred to as the server condition.

Furthermore, it should be guaranteed that no operating system functions are called from the target function because the operating systems cannot process a request from this context (since they have not switched into this context). The behavior of the operating system would not be predictable with such calls. This condition on the client is referred to as the first client condition.

Because the direct call occurs asynchronously to the runtime of the client, i.e. the client is interrupted during the direct call due to the server condition, problems can arise if the client itself calls the target function (or functions called from the target function). If scheduling to the server occurs during the call to the target function by the client that would then also call the target function, then the target function would be called a second time before the first call is ended. Such a second call requires a function to be reentrant. Reentrant functions are very complicated to construct. So that this complicated construction is not necessary, the client can only call the target function (or functions that are called from the target function) if the server can definitely not call the target function. This condition on the client is referred to as the second client condition.

Furthermore, the client may only access data that could be used or changed by the target function at times that the server can call the target function such that the access is performed entirely within a processor cycle or protected by flags. In other cases, the client could be interrupted by the server in the middle of a data access while it accesses data outside of its target function. An access to data that is performed entirely within a processor cycle is referred to as an atomic access. This condition on the client is referred to as the third client condition.

The server preferably deactivates the scheduler of the operating system in order to fulfill the server condition. The scheduler of the operating system is interrupt-controlled. The start function should suspend interrupt handling by means of a processor control register and guarantee that it cannot be interrupted by the scheduler of an operating system.

The client fulfills the first client condition by avoiding explicit operating system calls in the target function. Of course, it should also be guaranteed that there are no implicit operating system calls in the target function. Implicit operating system calls occur when exceptions appear, such as division by zero. Thus, the target function should be programmed without errors in order not to cause any exception conditions that result in an operating system call.

In case of a shortage of physical working memory, the operating system automatically swaps out parts of the memory to the hard disk. If a conventional task accesses swapped-out memory, an exception condition occurs that causes an implicit operating system call. In connection with this operating system call, the swapped-out memory will be read from the hard disk and written into the physical memory (working memory). Next, the task successfully accesses the desired memory without noticing the automatic operating system call.

Such an implicit operating system call during the runtime of the directly called target function would cause a critical state because the scheduler of the operating system proceeds on the assumption that the context of the server, and not the context of the client, is active.

In order to exclude such exception conditions, the swapping-out of memory that the target function accesses must be prevented. The operating system offers mechanisms in order to prevent the swapping out of memory. This process is referred to as locking. Therefore, to satisfy the first client condition, the entire memory accessed in the target function must be locked.

The client fulfills the second client condition by avoiding the target function calls at times where it is possible for the server to call the target function. Since the server must be activated by the client for calling the target function from the client, the client can block the call of its own target function during such an activation.

The client fulfills the third client condition by restricting accesses to data that could be used or changed by the call of the target function to atomic data accesses or accesses protected by flags, if there is the possibility that the server will call the target function.

Thus far, the conditions for the call to the target function by a context switch in the start function have been explained.

Of course, locking of program code and data in its entirety does not belong to the standard jobs (in the sense of task) of software development. Therefore, it is probable that errors will occur. Furthermore, there is the difficulty that the operating system will swap out the memory of a certain task depending on the requirements of another task. The swapping-out happens at unpredictable times. Because the operating system swaps out at unpredictable times, whether all necessary memory regions are locked cannot be tested. This testability problem demands a solution that cannot be offered by Method Variant 2.

The goal of Method Variant 3 that will now be described is that unlocked memory is recognizable not at unpredictable times, but rather immediately at the first call to the target function. For this purpose, the start function will perform the context switch not into the client context, but rather into a newly formed context. The setup of a new context means configuring the MMU of the processor. The new context is assembled from copies of parts of the client context and the server context. The new context is referred to as a copied context and forms the second context that will be switched into from the server context. The client portion of the copied context includes exactly the parts of the client context corresponding to the locked memory. The server portion of the copied context includes the start function and all data used by the start function.

The Method Variant 3, solves the testability problem of Method Variant 2 because there is no unlocked memory in the copied context. An access of the target function to such memory is immediately noticeable because it is not allowed if the MMU of the processor has switched into the copied context.

In connection with the description of the method for the direct call of a function in another memory context through configuration of the MMU of the processor, the fundamental problems have been explained with reference to Method Variants 1 and 2. Method Variant 1 does not enable the direct call of a sufficiently complex function for the execution of meaningful jobs (in the sense of task). Method Variant 2 is suitable for such a job, but it exhibits problems, in particular with testability.

Method Variant 3 which performs a context switch not into the client context, but rather into a copied memory context, wherein the memory of this copied memory context is completely locked, represents the optimum embodiment of the invention.

Analogously to shared memory as a means to achieve the highest possible data throughput between tasks, the represented method according to the invention supplies a means to achieve the highest possible determinability for an exchange of events between tasks. Thus, as shared memory enables direct data coupling, so the represented method enables direct event a coupling.

FIGS. 6–9

Figure 6:
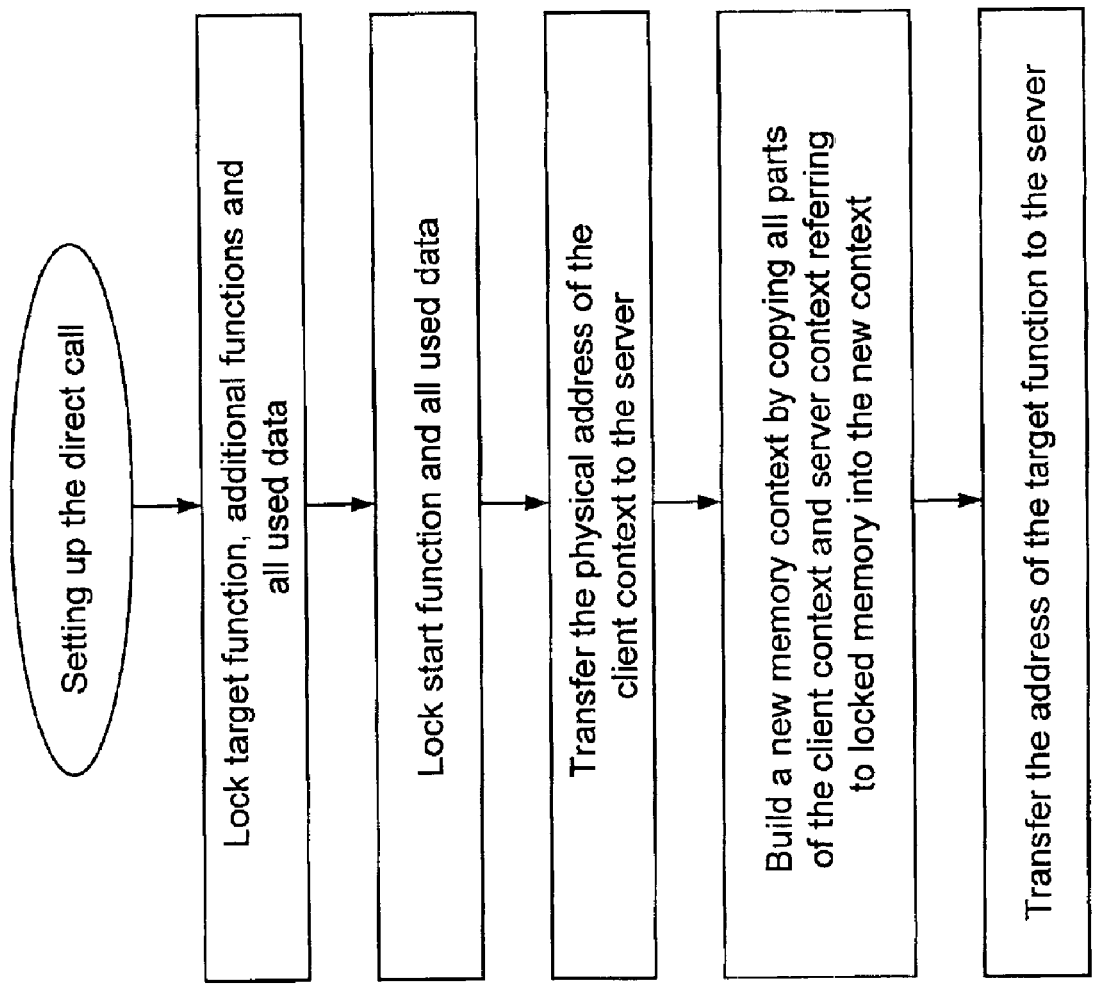
FIG. 6 is a flowchart diagram illustrating preparation of the direct call of the target function according to one embodiment of the invention.
Figure 7:
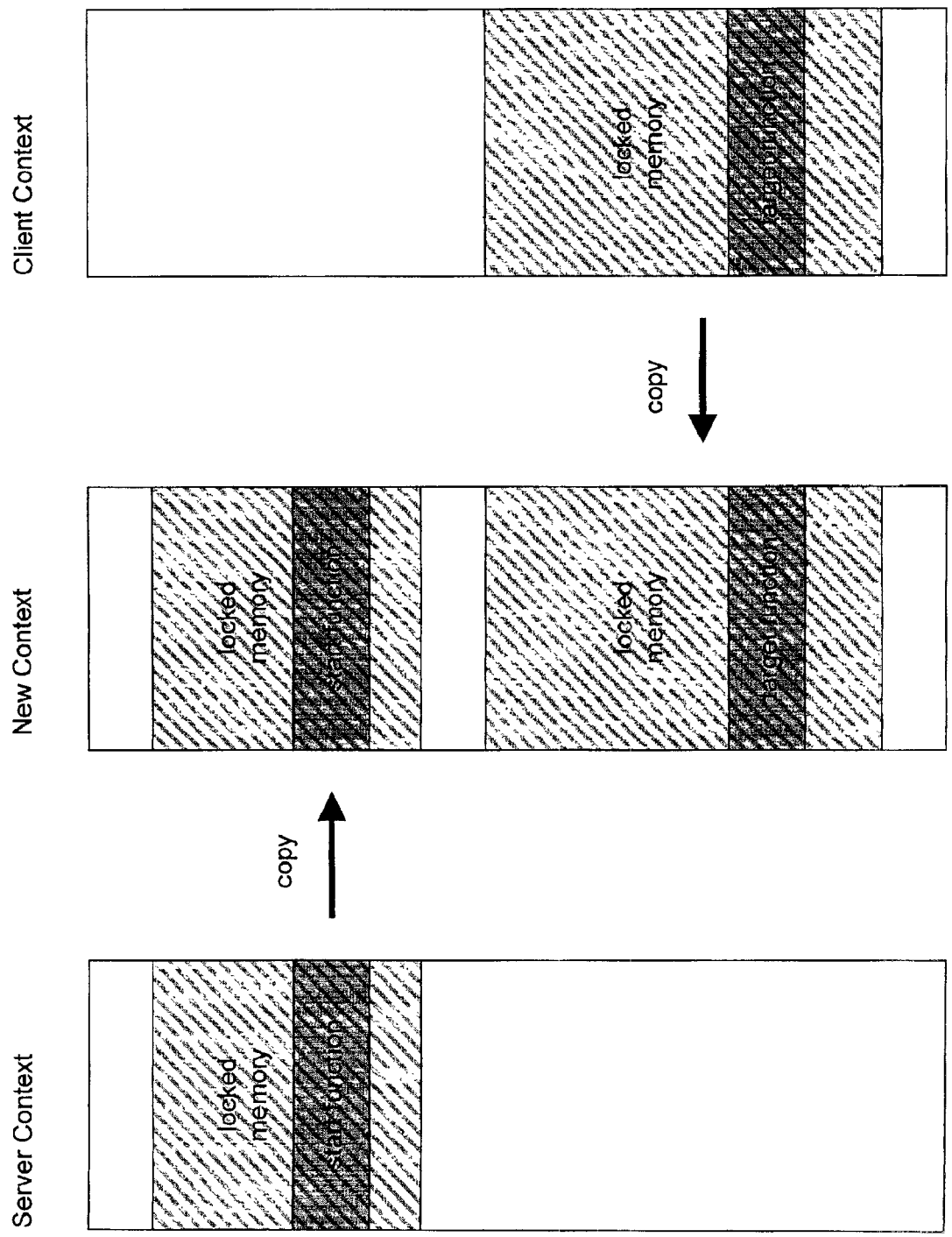
FIG. 7 shows the different memory contexts of the client and the server as well as the newly built context containing copies of the parts of the client context and the server context referring to locked memory.

FIGS. 6–9 show steps of the method according to one embodiment of the invention. In preparation of the direct call the target function, additional related functions and all used data are locked. Additionally, the start function and all data used by the start function are locked. The physical address of the client context is transferred to the server and a new memory context is built by copying all parts of the client context and the server context referring to locked memory into this new context. Finally the address of the target function is transferred to the server. These steps for preparing the direct call are shown in FIG. 6. FIG. 7 shows the different memory contexts of the client and the server as well as the newly built context containing copies of the parts of the client context and the server context referring to locked memory.

Figure 8:
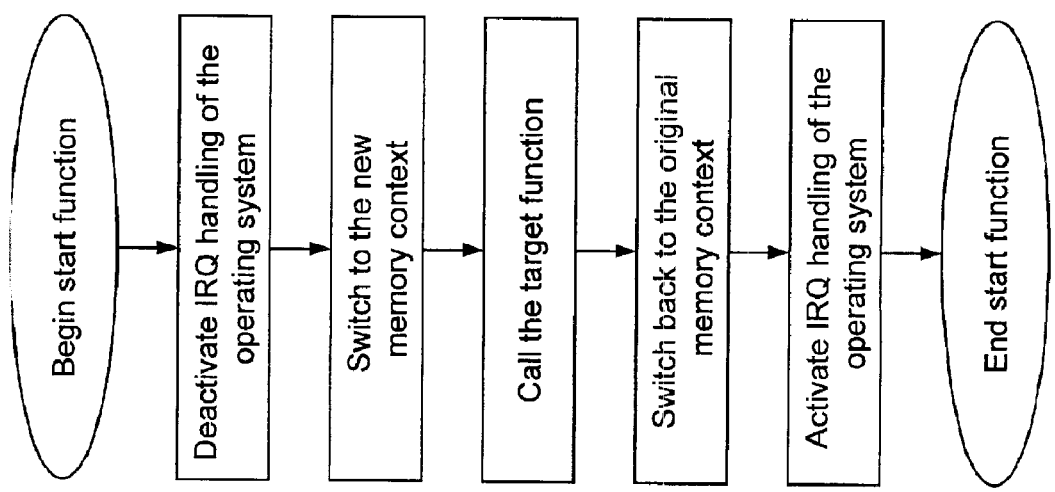
FIGS. 8 and 9 show the steps of the method according to one embodiment of the invention during the runtime of the direct call.
Figure 9:
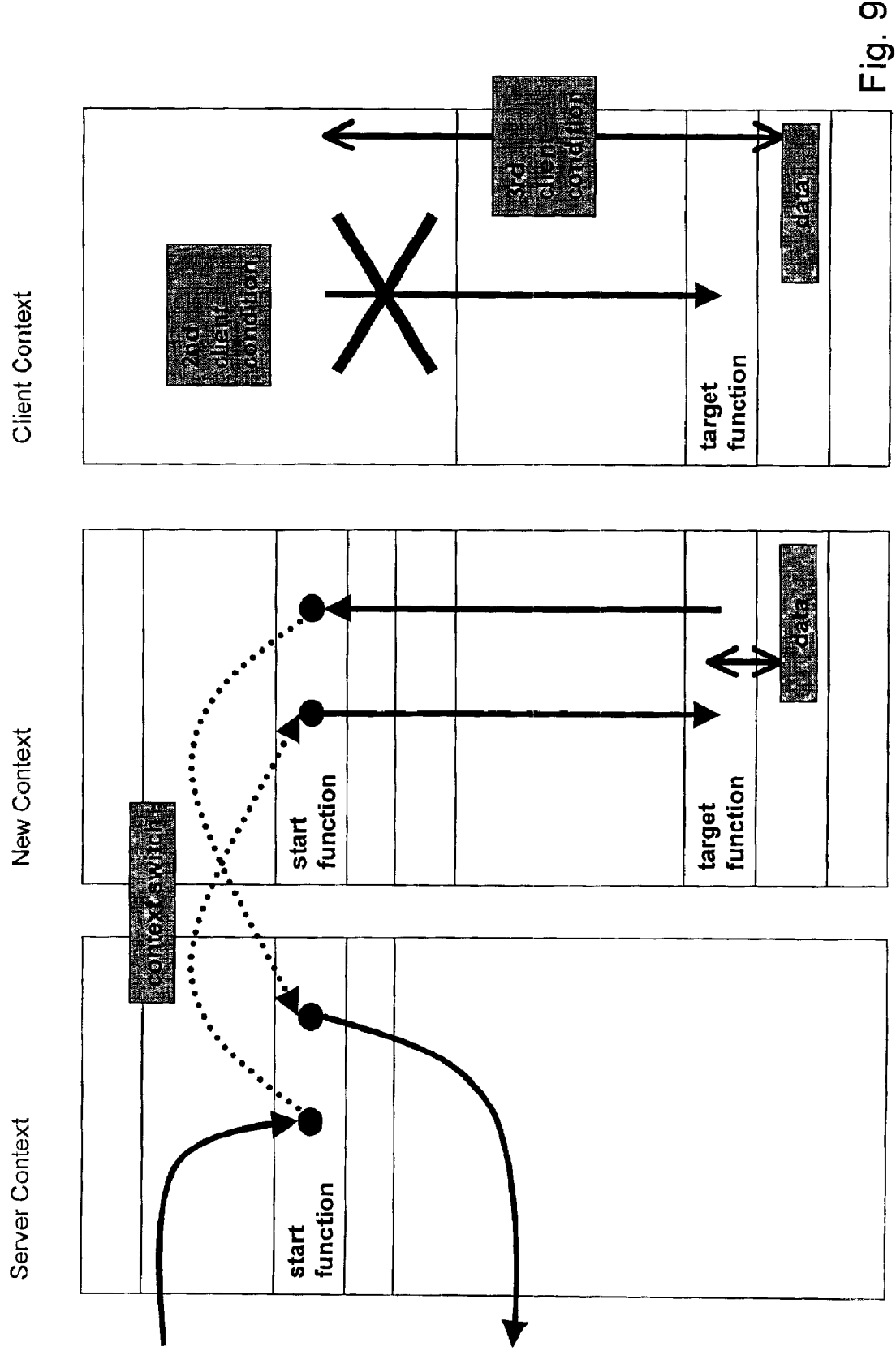

FIGS. 8 and 9 show the steps of the method according to one embodiment of the invention during the runtime of the direct call. In a first step the IRQ handling of the operating system is deactivated in order to block any scheduling by the operating system during the runtime of the direct call. Then the start function of the server switches from its own context to the new context by writing the physical address of the new memory context containing the target function into the MMU control register. Within the new memory context the start function calls the target function. After the execution of the target function the start function writes the physical address of the memory context of the server back into the MMU control register in order to switch back to the server context. Then the start function reactivates the IRQ handling of the operating system.

FIG. 9 shows the context switches and the call of the target function within the three memory contexts. The representation of the client context in FIG. 9 depicts some requirements that should be fulfilled in order to ensure the safe execution of the direct call. According to the crossed out arrow headed with the term "2nd client condition" the calls of the target function by the client are blocked during the runtime of the direct call. Further, during the runtime of the direct call data accesses from the client to data used by the target function are limited by the "3rd client condition", i.e. either to atomic accesses that can be performed within one processing cycle or to accesses protected by flags.

Although the system and method of the present invention is described in connection with several embodiments, it is not intended to be limited to the specific forms set forth herein, but on the contrary, it is intended to cover such alternatives, modifications, and equivalents, as can be reasonably included within the spirit and scope of the invention as defined by the appended claims.

We claim:

1. A method for a direct call of a target function by means of a start function in a computer system comprising a processor with a memory management unit (MMU), wherein the computer system includes an operating system, wherein the start function is a component of a first task with a first memory context and the target function is in another memory context, the method comprising:

copying parts of the memory context of the first task as well as parts of the memory context of a second task containing the target function into a new memory context;

the first task executing the start function to perform a context switch from the first memory context into the other memory context;

wherein the first task performing the context switch comprises the first task performing the context switch into the new memory context;

executing the target function in the other memory context;

reversing said context switch to return to the first memory context after executing the target function.

2. The method according to claim 1, wherein the processor includes a MMU control register;

wherein the first task performing the context switch includes the first task writing the physical address of the memory context of the task containing the target function into the MMU control register.

3. A method for a direct call of a target function by means of a start function in a computer system comprising a processor with a memory management unit (MMU), wherein the computer system includes an operating system, wherein the start function is a component of a first task with a first memory context and the target function is in a second memory context, the method comprising:

building a third memory context;

copying parts of the memory context of the first task as well as parts of the memory context of the second memory context containing the target function into the third memory context;

the first task performing a context switch to the third memory context;

executing the target function in the third memory context;

reversing said context switch to return to the first memory context after executing the target function.

4. The method of claim 3, further comprising:

locking the parts of a memory context of the first task as well as the parts of the memory context of the second task containing the target function;

wherein said locking occurs before said copying.

5. The method of claim 4, further comprising:

unlocking the parts of a memory context of the first task as well as the parts of the memory context of the second task containing the target function;

wherein said unlocking occurs after said copying.

6. The method of claim 3, further comprising:

the first task deactivating interrupt handling of the operating system.

7. The method of claim 6, wherein said deactivating includes changing a processor control register.

8. The method of claim 3 wherein the target function does not execute a subroutine included in the operating system.

9. The method of claim 3, further comprising:

blocking a second executing of the target function during said executing the target function.

10. A system for performing a direct call of a target function, wherein the system is operable to execute on a processor with a memory management unit (MMU) in a computer operated by an operating system, the system comprising:

a start function operable to be executed, wherein the start function is a component of a first task with a first memory context;

a function operable to copy parts of the memory context of the first task as well as parts of a memory context of a second task containing the target function into a new memory context;

the target function operable to be executed, wherein the target function is in a second memory context, wherein the first task performs a context switch from the first memory context into the other memory context, wherein the first task performing the context switch comprises the first task performing the context switch into the new memory context, and wherein the context switch is reversed after the execution of the target function.

* * * * *